(12) United States Patent
Adriazola et al.

(10) Patent No.: US 8,775,668 B2
(45) Date of Patent: Jul. 8, 2014

(54) REDIRECTION OF MULTIMEDIA CONTENT BETWEEN RECEIVER DEVICES ASSOCIATED WITH A USER

(75) Inventors: Aldo Adriazola, Bridgewater, NJ (US); David Hayward, Lincroft, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 175 days.

(21) Appl. No.: 12/332,006

(22) Filed: Dec. 10, 2008

(65) Prior Publication Data

US 2010/0146076 A1 Jun. 10, 2010

(51) Int. Cl.
*G06F 15/173* (2006.01)

(52) U.S. Cl.
USPC .......................................................... 709/238

(58) Field of Classification Search
USPC .......................................................... 709/238
See application file for complete search history.

(56) References Cited

U.S. PATENT DOCUMENTS

| | | | |
|---|---|---|---|
| 2005/0183025 A1* | 8/2005 | Kumar | 715/764 |
| 2005/0262254 A1* | 11/2005 | Sherwani | 709/231 |
| 2006/0117379 A1 | 6/2006 | Bennett et al. | |
| 2007/0130592 A1 | 6/2007 | Haeusel | |
| 2007/0155427 A1 | 7/2007 | Tran | |
| 2007/0192806 A1* | 8/2007 | Park et al. | 725/80 |
| 2008/0127257 A1 | 5/2008 | Kvache | |
| 2008/0214186 A1* | 9/2008 | Bizzarri et al. | 455/425 |
| 2009/0055530 A1* | 2/2009 | Pince et al. | 709/224 |

* cited by examiner

*Primary Examiner* — Noel Beharry
*Assistant Examiner* — Farhad Ali
(74) *Attorney, Agent, or Firm* — Guntin & Gust, PLC; Ralph Trementozzi

(57) ABSTRACT

A provider network is configured to redirect multimedia content between receiver devices associated with a user. Initially, a multimedia stream representative of the multimedia content is transmitted via the provider network to a first receiver device associated with the user. In response to a redirect stimulus, the provider network redirects the streaming of the multimedia content to a second receiver device associated with the user. The multimedia stream transmitted to the second receiver device can be formatted based on the characteristics of the network link between the provider network and the second receiver device, based on specified formatting rules associated with the second receiver device, and the like. The redirect stimulus can include a user-initiated redirect command provided to the provider network via the first receiver device, the second receiver device, or a third device. Alternately, the redirect stimulus can include an automated stimulus generated based on redirect rules.

19 Claims, 11 Drawing Sheets ured to scale. For example, the dimensions of
REDIRECTION OF MULTIMEDIA CONTENT BETWEEN RECEIVER DEVICES ASSOCIATED WITH A USER

FIELD OF THE DISCLOSURE

The present disclosure generally relates to the provision of multimedia content, and more particularly, to the provision of multimedia content via a network.

BACKGROUND

Service providers, such as cable television providers and satellite television providers, typically facilitate the streaming of multimedia content from a content source to a receiver device associated with a user. However, during the streaming of the multimedia content, the user may desire to cease interaction with the original receiver device without losing access to the streaming multimedia content. Conventional techniques have been implemented whereby the original receiver device receives the multimedia stream and then forwards the multimedia stream to another receiver device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
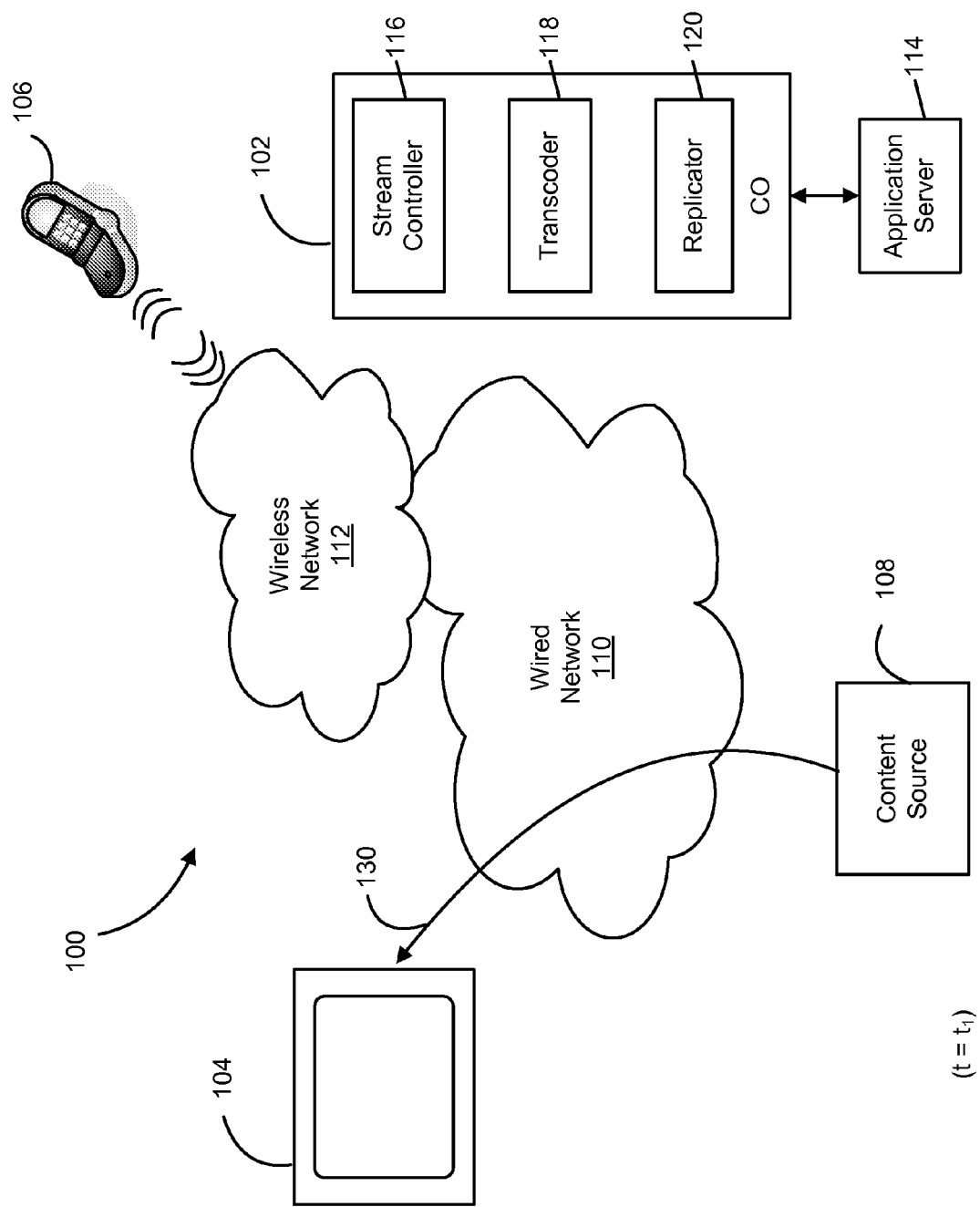
FIGS. 1 and 2 are diagrams illustrating an operation of an example multimedia content distribution system in accordance with at least one embodiment of the present disclosure.

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

FIGS. 1-11 illustrate example techniques for redirecting, within a provider network, multimedia content between receiver devices associated with a user. Initially, a multimedia stream representative of the multimedia content is transmitted via the provider network to a first receiver device associated with the user. In response to a redirect stimulus, the provider network redirects the streaming of the multimedia content to a second receiver device associated with the user. This redirection can include terminating transmission of the multimedia stream to the first receiver device and initiating transmission of a multimedia stream representative of the multimedia content to the second receiver device. Alternately, the provider network can replicate the multimedia content so that multimedia content can continue to be streamed to the first receiver device and concurrently streamed to the second receiver device. The multimedia stream transmitted to the second receiver device (the "redirected multimedia stream") can be formatted based on the characteristics of the network link between the provider network and the second receiver device, based on specified formatting rules or characteristics associated with the second receiver device, and the like. The redirect stimulus that initiates the redirecting of the multimedia content can include a user-initiated redirect command provided to the provider network via either the first receiver device or the second receiver device. The redirect stimulus also can include a redirect command transmitted to the provider network via a third party device or component. To illustrate, the redirect stimulus can be generated via a web portal provided by the provider network, thereby allowing, for example, a parent to redirect multimedia content between receiver devices used by a child or allowing a network operations center to switch the multimedia content between a user's receiver devices when the user is having difficulty with one of the receiver devices. Alternately, the redirect stimulus can include an automated stimulus generated in response to the provider network (or one or both of the receiver devices) detecting that the parameters or conditions of a specified redirect rule has been met. The redirect rule can include, for example, a specified change in the location of the first receiver device, a specified change in the location of the second receiver device, the occurrence of a particular time, day, week, date, and the like. A graphical user interface (GUI) can be provide to elicit user input to generate redirect rules, to associated particular receiver devices with a user, and the like.

The term "multimedia" refers to video content, audio content, or a combination thereof. Accordingly, the term "multimedia stream" refers to a stream of data representative of video content, audio content, or a combination thereof. The term "presentation" refers to the display of video content in a video context, the audible output of audio content in an audio context, or a combination thereof. Accordingly, the presentation of a multimedia stream includes one or both of a display of at least a portion of the stream of video content of the multimedia stream and the audible output of at least a portion of the stream of audio content of the multimedia stream. The term "receiver device" refers to a device that terminates a multimedia stream (i.e., processes the multimedia content of the multimedia for presentation at a corresponding display/audio system). Examples of receiver devices include, but are not limited to, a networked home entertainment system, a videoconferencing system, a networked personal computer (e.g., desktop or notebook computer), a networked mobile device (e.g., a data-enabled cellular telephone or a networked personal digital assistant), and the like.

Figure 2:
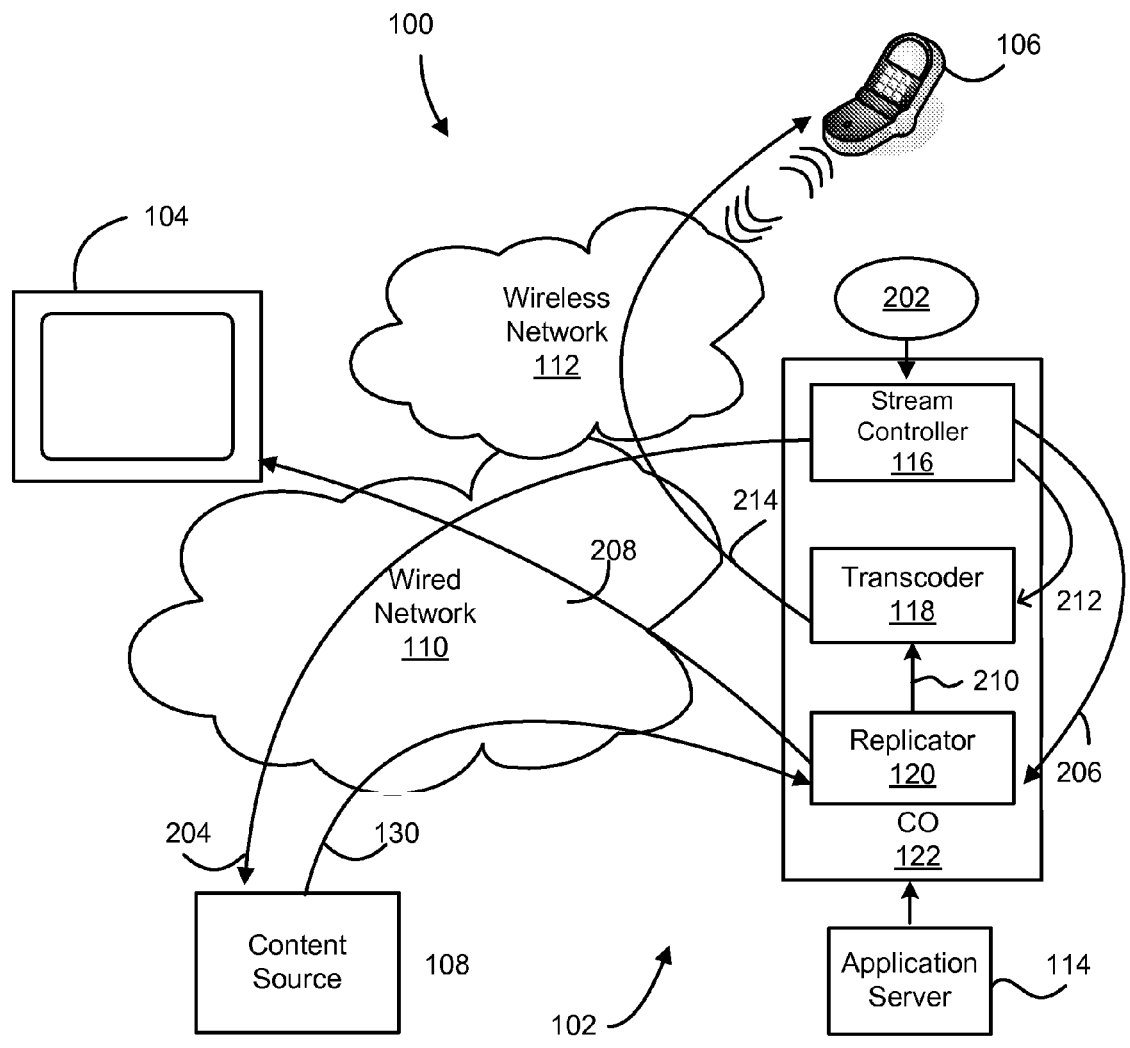

FIGS. 1 and 2 illustrate an operation of an example multimedia content distribution system 100 in accordance with at least one embodiment of the present disclosure. The multimedia content distribution system 100 includes a provider network 102, a plurality of receiver devices (e.g., receiver devices 104 and 106) associated with a specified user, and a content provider 108. The receiver devices 104 and 106 can include any of a variety of multimedia-enabled devices, including, but not limited to, a networked personal computer (PC), a data-enabled cellular phone, a networked PDA, and the like. For purposes of the example of FIGS. 1 and 2, the receiver device 104 is illustrated as a video conferencing system at the user's office location and the receiver device 106 is illustrated as a data-enabled cellular phone.

The content source 108 is configured to provide a multimedia stream representative of multimedia content for transmission to one or more receiver devices via the provider network 102. To illustrate, the content source 108 can include a broadcast television or cable television source for linear and on-demand television programming. As another example, the content source 108 can include a data server for network-based multimedia distribution (e.g., the web server for a webpage that facilitates the distribution of multimedia content via the Internet). As yet another example, the multimedia content being streamed can include a bi-directional stream of, for example, a video teleconference, in which case the content source can include a central video teleconference server or, alternately, the network equipment of the other parties to the video teleconference. Although content source 108 is illustrated as separate from the provider network 102 in FIGS. 1 and 2, the provider network 102 can include the content source 108 in other embodiments.

The application server 114, in one embodiment, serves as a repository of profile information related to users associated with the provider network 102. A user's profile information can include, for example, account/billing information, information about the receiver devices associated with the user, and information about redirect rules that are used to control redirection of multimedia content for the user. The application server 114 further can provide a website, webpage, or other graphical user interface (GUI) to obtain the user's profile information, as described in greater detail below with reference to FIGS. 7-9.

The provider network 102 includes one or more network portions for communicating data and other signaling, including one or more private network portions, one or more public network portions, or a combination thereof. In the example illustrated in FIGS. 1 and 2, the provider network 102 includes a wired network 110 (e.g., the Internet, a private Internet-Protocol (IP)-based network, etc.) and a wireless network 112 (e.g., a cellular network, a wireless local area network (WLAN), and the like). The provider network 102 further includes a stream controller 116, a transcoder 118, and a stream replicator 120. For purposes of illustration, an example implementation of the stream controller 116, the transcoder 118, and the stream replicator 120 as part of a central office (CO) 122 of the provider network 102 is described. However, the stream controller 116, the transcoder 118, and the stream replicator 120 can be implemented together or separately at any of a number of points within the provider network 102 without departing from the scope of the present disclosure.

The stream replicator 120 is configured to replicate a received multimedia stream to generate two or more multimedia streams that are duplicates of the received multimedia stream. The transcoder 118 is configured to transcode a received multimedia stream based on specified transcode parameters to generate a transcoded multimedia stream. The stream controller 116 is configured to facilitate multimedia content redirection within the provider network 102. The stream controller 116, in one embodiment, monitors certain characteristics of the provider network 102 and the receiver devices of the user and determines when to redirect a multimedia stream between receiver devices responsive to the monitored characteristics. As described in greater detail below, these characteristics can include characteristics that stimulate, or trigger, a redirection process, as well as characteristics that direct the handling of a redirected multimedia stream when the redirection process has been triggered. The characteristics that stimulate the redirection process can include user-initiated redirect commands received from one or more of the user's receiver devices, a location characteristic of a receiver device (provided via, e.g., global position system (GPS) information or wireless/cellular triangulation), a timing characteristic (e.g., time of day, day of week, etc.), a power level characteristic (e.g., remaining battery power), a signal level characteristic, and the like. The characteristics that direct the handling the redirected multimedia stream can include, for example, the bandwidth capabilities, quality-of-service (QoS), and other transmission characteristics of the network link between the provider network 102 and the receiver device that is to receive the redirected stream, the multimedia processing capabilities of the receiver device, and the like. In at least one embodiment, the stream controller 116 applies one or more redirection rules in determining whether to initiate a redirection process, and these redirection rules can be user-specified or user-programmed via a graphical user interface (GUI) or other interface provided by, for example, the application server 114.

FIGS. 1 and 2 together illustrate an example operation of the multimedia content distribution system 100 with respect to redirection of multimedia content between receiver devices associated with a user. In FIG. 1, multimedia content is transmitted from the content source 108 to the receiver device 104 via the wired network 110 of the provider network 102 in the form of a multimedia stream 130 (at time $t_1$). The multimedia content of the multimedia stream 130 can include, for example, the audio and video content of one or more parties' participation in a video teleconference, the audio and video content of a linear television program or an on-demand program, audio content from an Internet radio station or an on-line audio service, and the like. As also illustrated in FIG. 1, the receiver device 106 of the user remains idle vis-à-vis the multimedia content at time $t_1$.

In FIG. 2, a redirect stimulus 202 at time $t_2$ triggers the stream controller 116 to initiate a redirect process for the multimedia content being provided by the content source 108. The redirect stimulus 202 can include, for example, a user-initiated redirect stimulus, such as a redirect command transmitted from the receiver device 104 or the receiver device 106 to the provider network 102. Alternately, the redirect stimulus 202 can include a trigger internally generated by the stream controller 116 in response to determining that a predefined trigger event has occurred. The predefined trigger event can be specified by a set of one or more redirect rules set by the user or other party. For example, the user can set a redirect rule that specifies the generation of the redirect stimulus 202 responsive to the receiver device 106: entering a specified location; leaving a specified location; exceeding a certain distance from the receiver device 106 or other reference location; coming within a certain distance of the receiver device 106 or other reference location; and the like. As another example, the user can set a redirect rule that specifies the generation of the redirect stimulus 202 responsive to the receiver device 104: falling below a specified minimum battery power reserve; having a signal strength below a specified minimum; and the like. Accordingly, the stream controller 116 monitors the characteristics of the multimedia content delivery system 100 relating to the parameters of the redirect rules and triggers the redirect process in response to monitored characters meeting the parameters of one or more redirect rules. For purposes of the following, it is assumed that the redirect stimulus 202 is either a user-specified redirect command to direct the provider network 102 to redirect the multimedia content to the receiver device 106 or a redirect rule that is triggered to direct the provider network 102 to redirect the multimedia content to the receiver device 106.

In initiating the redirect process, the stream controller 116 verifies that the receiver device 106 is authorized to receive the multimedia content by, for example, accessing the user profile and device profile information from the application server 114. Upon successful authorization, the stream controller 116 sends a redirect signal 204 to the content source 108 to direct the content source 108 to redirect the multimedia stream 130 to the stream replicator 120. As discussed above, the redirection of the multimedia stream can include duplication of the multimedia stream such that the original multimedia stream continues to be provided to the original receiver device and a copy or other representation of the duplicate stream is provided to the alternate receiver device. For the examples of FIGS. 1 and 2, it is assumed that the redirection includes this duplication process. Accordingly, the stream controller 116 also sends a duplication signal 206 to the stream replicator 120 to direct the stream replicator 120 to duplicate, or fork, the incoming multimedia stream 130 so that two copies, multimedia stream 208 and 210, are generated. The multimedia stream 208 is streamed to the receiver device 104 via the provider network 102. The other multimedia stream 210 is processed for provision to the receiver device 106.

In many instances the circumstances of the receiver device 106 may necessitate further formatting of the data represented by the multimedia stream 210 before the corresponding multimedia content can be transmitted to the receiver device 106. To illustrate, the receiver device 106 may be a wireless device (e.g., a cellular phone or a notebook computer connected to the provider network 102 via an IEEE 802.11x-compliant WLAN) and the network link with the receiver device 106 may not be capable of supporting the bandwidth requirements of the multimedia stream 210. As another consideration, the receiver device 106 may not have the capability to support certain aspects of the multimedia content. The receiver device 106, for example, may not have a video display and thus may only support audio content. Further, the receiver device 106 may be capable of supporting a particular aspect of the multimedia content, but the user may not wish to employ that aspect at the receiver device 106. In such circumstances, it could prove inefficient to transmit data that will not be put to beneficial use at the receiver device 106. Accordingly, the stream controller 116 can determine those conditions and characteristics related to the network link with the receiver device 106, as well as the processing characteristics of the receiver device 106 itself, and direct the transcoder 118, via format signal 212, to format the data of the multimedia stream 210 accordingly to generate a formatted multimedia stream 214. The formatting performed by the transcoder 118 can include, for example, format conversion (e.g., from an MPEG format to an H.264 format), transcoding to reduce the data bandwidth requirements (e.g., by reducing resolution, reducing pixel depth, etc.), transrating, or by stripping out certain aspects of the multimedia content (e.g., stripping out the video content or stripping out the audio content). The formatted multimedia stream 214 then is transmitted from the CO 122 to the receiver device 106 via the wired network 110 and the wireless network 112 of the provider network 102.

As illustrated by FIG. 2, redirection of multimedia content between receiver devices associated with a user occur within the provider network 102 itself, rather than via one of the user's receiver devices, thereby reducing duplicate transmission of data to and from the user's receiver device that otherwise would be needed to implement a user device-based redirection. Further, because the provider network 102 is situated to more effectively monitor the statuses and characteristics of the user's receiver devices, the provider network 102 can more effectively implement certain automated processes for initiating redirection of multimedia content.

Figure 3:
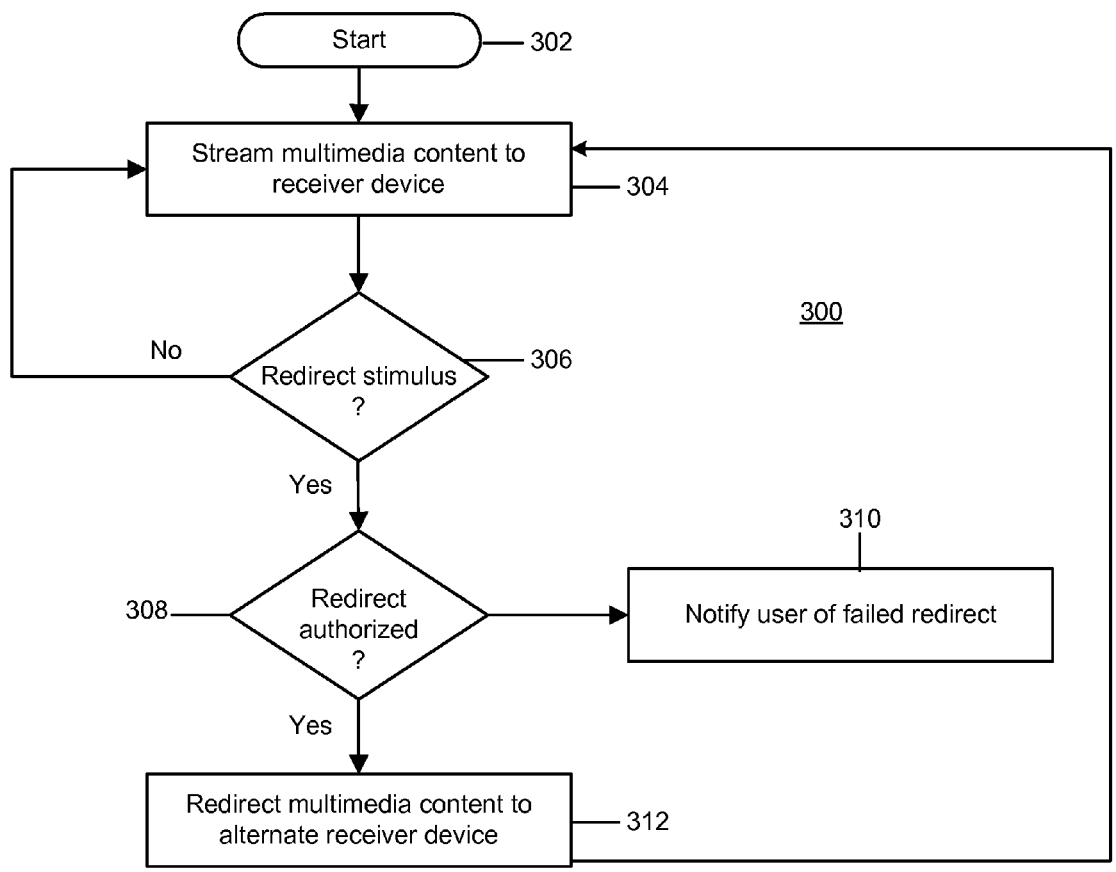
FIG. 3 is flow diagram illustrating an example method for selectively redirecting a multimedia stream from one receiver device to another receiver device in accordance with at least one embodiment of the present disclosure.

FIG. 3 illustrates an example method 300 of redirecting multimedia content between receiver devices associated with a user via a provider network in accordance with at least one embodiment of the present disclosure. For ease of illustration, the method 300 is described in the example context of the multimedia content distribution system 100 of FIGS. 1 and 2.

At block 302, the user initiates a session between the receiver device 104 and the content source 108 (e.g., by "tuning" the receiver device 104 to a particular "channel", by accessing a particular website, by initiating a video teleconference via teleconferencing software, etc.). At block 304 the content source 108 streams a multimedia stream representative of multimedia content to the receiver device 104 via the provider network 102 and the receiver device 104 processes the multimedia stream for presentation of the multimedia content. Concurrent with the transmission of the original multimedia stream, at block 306 the stream controller 116 of the provider network 102 monitors for a redirect stimulus. The redirect stimulus can originate in the form of a user-initiated redirect command received from the receiver device 104 or another receiver device associated with the user (e.g., receiver device 106), or the redirect stimulus can result from the stream controller 116 determining that the current conditions/characteristics of the provider network 102, the receiver device 104 or the receiver device 106 meet the parameters of one or more redirect rules.

Figure 4:
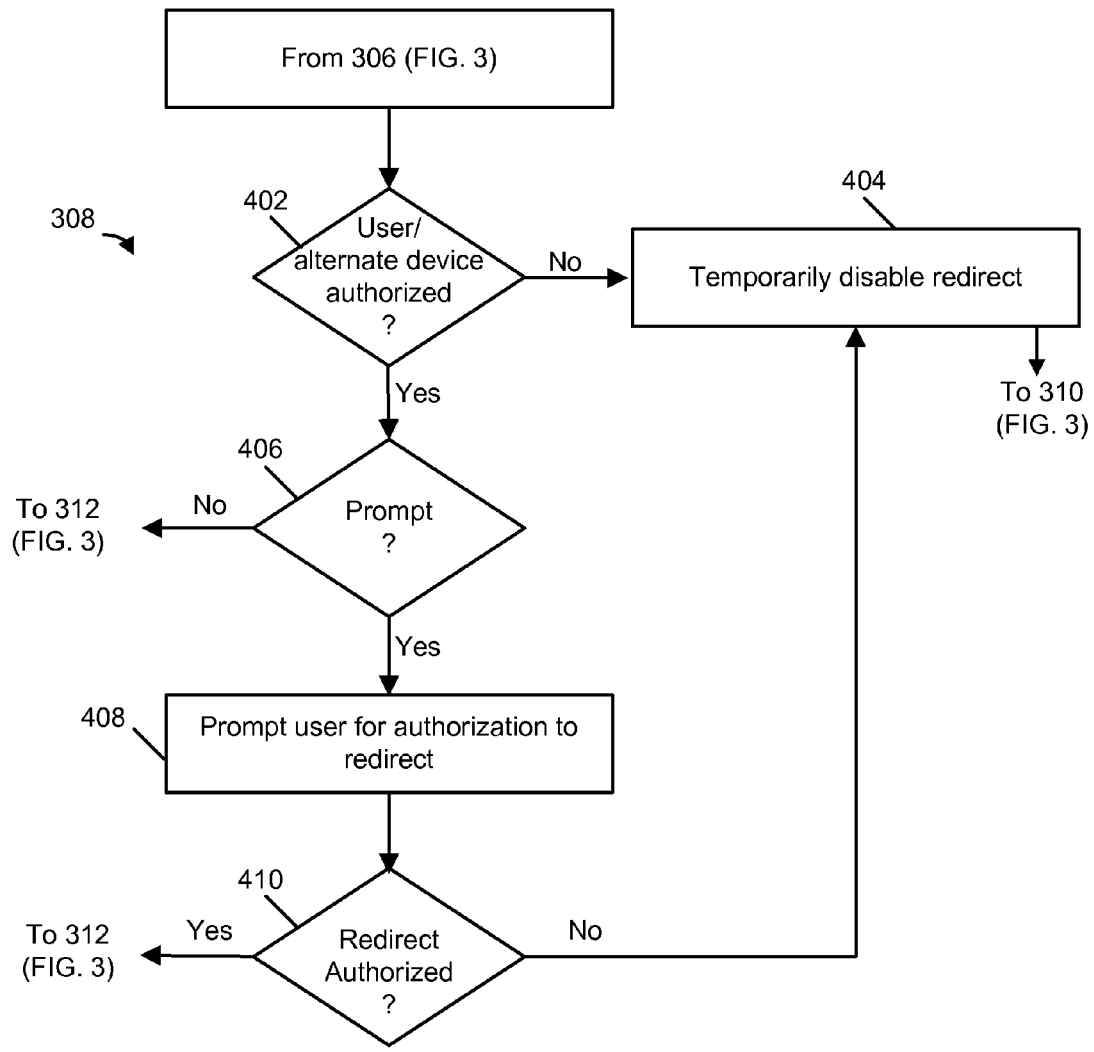
FIG. 4 is a flow diagram illustrating an example method for authorizing redirection of a multimedia stream in accordance with at least one embodiment of the present disclosure.

In the event that a redirect stimulus has occurred, at block 308 the stream controller 116 determines whether the redirection of the multimedia content is authorized. FIG. 4 illustrates an example implementation of the authorization process. In the event that redirection is not authorized (either by the user or by a certain profile), at block 310 the user can be notified of the failed attempt to redirect the multimedia content via, e.g., a message presented at the receiver device 104. In response, the user may elect to disable the redirect rule that initiated the redirect attempt, or the user may elect to seek authorization by, for example, registering for the redirect service or registering an alternate receiver device. Otherwise, if the redirection is authorized, at block 312 the stream controller 116 initiates the process of redirecting the multimedia content to the receiver device 106 via the provider network 102 as described above and as described in greater detail below. The method 300 then can return to block 304 whereby the stream controller 116 streams the multimedia content to the receiver device 106 and monitors for a subsequent redirect stimulus at a second iteration of block 306 that initiates a redirection of the multimedia content to another receiver device associated with the user (e.g., back to the original receiver device 104 or to a third receiver device associated with the user).

FIG. 4 illustrates an example implementation of the redirect authorization process of block 308 of method 300 of FIG. 3 in accordance with at least one embodiment of the present disclosure. After triggering the redirect process in response to a redirect stimulus at block 306 (FIG. 3), at block 402 the stream controller 116 accesses the user's information from the application server 114 (FIG. 1) and determines whether the redirection of the multimedia content is authorized. The authorization can be based on, for example, the profile of the user (e.g., whether the user has subscribed to the redirect service), the profile of the receiver device to which the multimedia content is to be directed (e.g., whether the receiver device 106 is affiliated with the service provider that supports the provider network 102), and the like. In the event that the redirection is not authorized based on the user's profile or the profile of the receiver device, at block 404 the stream controller 116 can temporarily disable the redirect rule that resulted in the redirect stimulus, or if the redirect stimulus was a result of direct user input, the stream controller 116 can disable the user's ability to initiate the redirection process or delist the receiver device 106 from the list of devices available to the user for redirection.

Otherwise, if redirection is otherwise authorized by the profile information, at block 406 the stream controller 116 determines whether the redirect stimulus is an automatically generated stimulus based on a redirect rule. If not, the flow proceeds to the process of block 312 of FIG. 3 as discussed above. If so, it may be appropriate to obtain express verification from the user that redirection is acceptable to the user. To illustrate, the redirect stimulus may have been generated by a redirect rule that triggers when the receiver device 106 leaves a specified location while the multimedia content is still be streamed to the receiver device 104. Accordingly, at block 408 the stream controller 116 further can prompt the user for authorization to proceed with the redirection. This prompt can take the form of, for example, a dialog box displayed at one or both of the receiver device 104 or the receiver device 106. This prompt also can serve to determine whether the user wants the redirection to include replication of the multimedia stream so that the multimedia content, or a portion thereof, is received at both the receiver device 104 and the receiver device 106.

At block 410 the stream controller 116 determines from the user's reply to the prompt whether the redirection of the multimedia content is authorized by the user. If not user authorized, the flow proceeds to the process of block 404 of temporarily disabling the redirect rule that initiated the redirect process, as described above. Otherwise, if the user has authorized redirection, the flow proceeds to the redirection process of block 312 of FIG. 3 described above.

Figure 5:
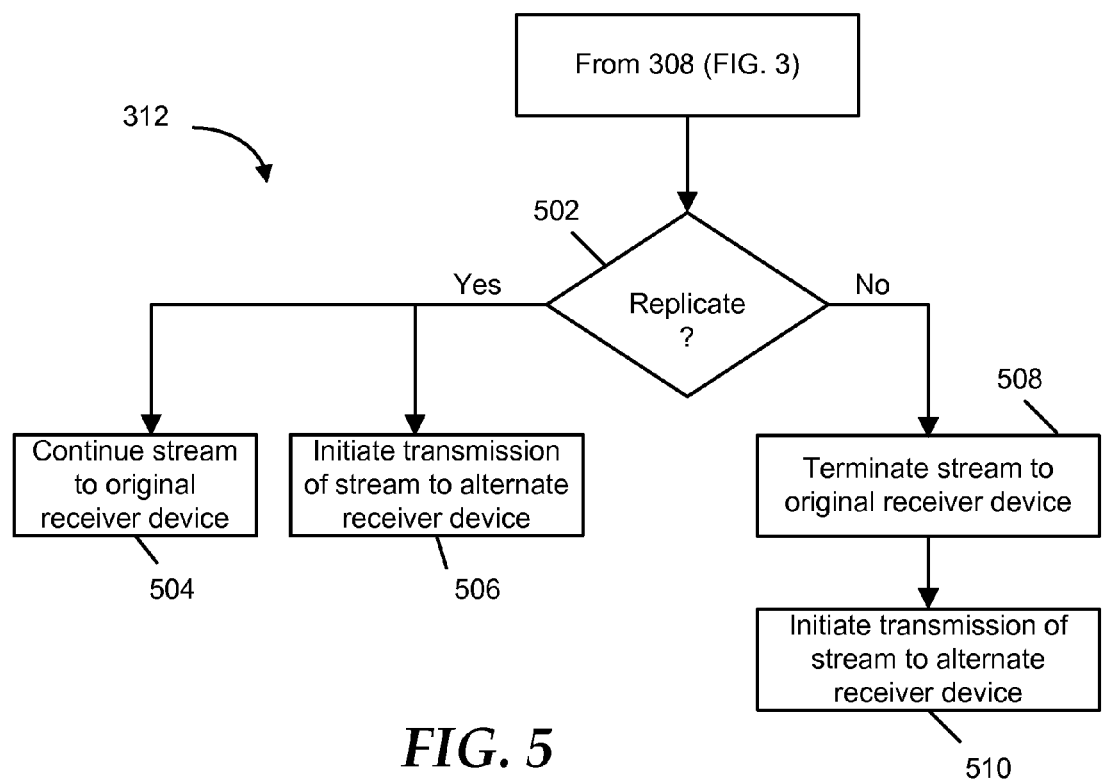
FIG. 5 is a flow diagram illustrating an example method for redirecting a multimedia stream within a provider network in accordance with at least one embodiment of the present disclosure.

FIG. 5 illustrates an example implementation of the multimedia content redirection process of block 312 of method 300 of FIG. 3 in accordance with at least one embodiment of the present disclosure. After determining the redirection of the multimedia content is authorized (by the service provider, the content source, the user, or a combination thereof) as described above with respect to block 308 of FIG. 3, at block 502 the stream controller 116 determines whether the redirection process is to involve replication of the multimedia content so that more than one receiver device of the user can receive the multimedia content. This determination can be made from the user profile information or device profile information provided by the application server 114 (FIG. 1). Alternately, the stream controller 116 can prompt the user for direction regarding replication.

In the event that the redirection of the stream is to involve replication, at block 504 the stream controller 116 arranges for the original multimedia stream to continue to be transmitted to the original receiver device (e.g., receiver device 104). Concurrently, at block 506 the stream controller 116 initiates transmission of a copy of the multimedia stream (or a reformatted version thereof) to the new receiver device (e.g., receiver device 106). As described above with respect to FIG. 2, the stream controller 116 can achieve the processes of block 504 and 506 by signaling to the content source 108 to redirect the multimedia stream 130 to the stream replicator 120 so that two or more copies of the multimedia stream 130 can be generated for distribution to the receiver devices of the user. In another embodiment, the content source 108 can continue to transmit the original multimedia stream 130 to the receiver device 104 and the stream controller 116 can direct the content source 108 to transmit a separate multimedia stream representative of the same multimedia content to the central office 122 for processing and transmission to the receiver device 106.

Otherwise, in the event that the redirect process is not to involve replication of the multimedia content for two or more receiver devices, at block 508 the stream controller 116 signals the content source 108 to terminate the multimedia stream 130 being transmitted to the receiver device 104 and at block 510 the stream controller 116 initiates the transmission of a multimedia stream for the multimedia content to the receiver device 106. In one embodiment, the stream controller 116 can signal the format/transmission parameters for the multimedia stream so that the content source 108 can generate a multimedia stream in accordance with these parameters and then transmit the multimedia stream directly to the receiver device 106 via the provider network. In an alternate embodiment, the content source 108 can transmit the multimedia stream to the CO 122, whereupon the transcoder 118 at the CO 122 can be used to format the multimedia stream in accordance with the specified parameters, and the resulting multimedia stream then transmitted from the CO 122 to the receiver device 106 via the provider network 102.

Figure 6:
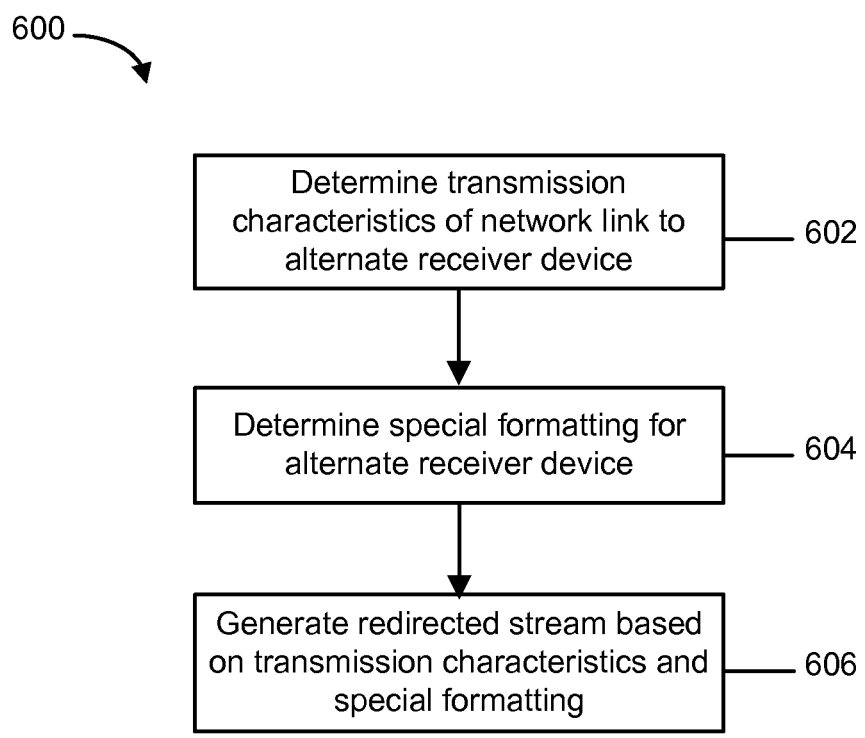
FIG. 6 is a flow diagram illustrating an example method for processing a redirected multimedia stream for a particular receiver device in accordance with at least one embodiment of the present disclosure.

FIG. 6 illustrates an example method 600 for formatting a multimedia stream for multimedia content redirected to a receiver device in accordance with at least one embodiment of the present disclosure. For ease of illustration, the method 600 is described in the context of the multimedia content distribution system 100 of FIGS. 1 and 2. Upon determining that multimedia content is to be redirected to a new receiver device (e.g., receiver device 106), at block 602 the stream controller 116 determines the transmission characteristics of the network link to the new, or alternate, receiver device. The transmission characteristics of the network link can include, for example, an average bandwidth/bit rate of the network link, a maximum bandwidth/bit rate of the network link, an average delay or jitter of the network link, a quality-of-service (QoS) characteristic, and the like.

At block 604, the stream controller 116 determines whether there are any special formatting features associated with the new receiver device. These special format features can include, for example, particular encoding schemes supported or not supported by the receiver device, particular content types to be included or omitted from transmission to the receiver device, and the like. The stream controller 116 can determine these special formatting features from the profile of the receiver device. To illustrate, the device profile may indicate that the receiver device is a cellular phone without video capabilities, and thus the receiver device can determine that video content is not to be redirected to the receiver device. Alternately, as described in greater detail below, the user can specify particular formatting parameters for the redirection. To illustrate, the user could specify that video teleconference content redirected to the user's cellular phone is only to include the audio content.

At block 606, the multimedia stream intended for redirection to the receiver device is received at the transcoder 118 and the stream controller 116 directs the transcoder 118 to transcode the multimedia stream based on the transmission characteristics and the special formatting parameters to generate a redirected stream for transmission to the receiver device. To illustrate, the bandwidth characteristics can be used by the transcoder 118 control the bit rate of the resulting stream. As another example, an indication that the receiver device supports MPEG streams only can be used by the transcoder 118 to reformat a received H.264 stream to an MPEG stream.

Figure 7:
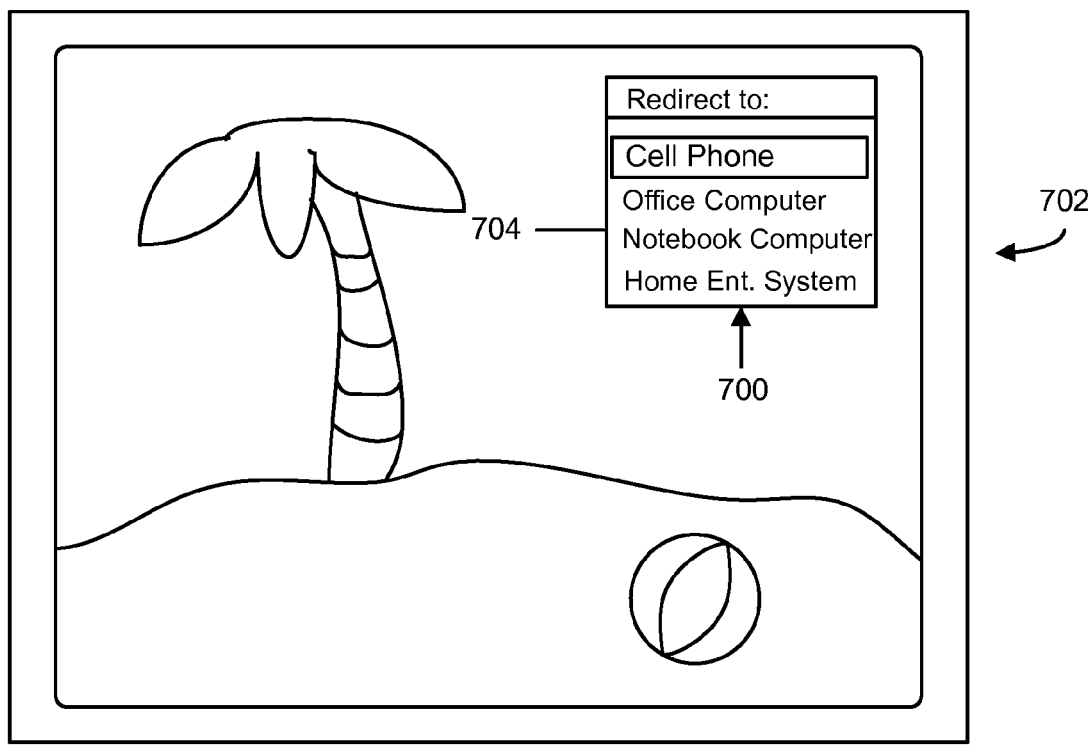
FIG. 7 is a diagram illustrating an example graphical user interface (GUI) for user-initiated redirection in accordance with at least one embodiment of the present disclosure.

FIG. 7 illustrates an example graphical user interface (GUI) 700 for facilitating redirection of multimedia content between receiver devices associated with a user in accordance with at least one embodiment of the present disclosure. In the depicted embodiment, the GUI 700 has the form of an on screen display (OSD) that is displayed on the screen 702 of a receiver device in response to user input indicating a request to redirect multimedia content. The user input can include, for example, selection of a designated button or a soft button at the receiver device, input received at the receiver device via a remote control or other input device operated by the user, and the like. The receiver device can include the original receiver device or the alternate receiver device to which the multimedia content is to be redirected.

The GUI 700 can include a listing 704 of receiver devices associated with the user so that the user can interact with the GUI 700 to select the alternate receiver device that is to receive the redirected multimedia content. Upon receipt of a particular receiver device, the GUI 700 can interact with the receiver device to generate a redirect command for transmission to stream controller 116 of the provider network 102. Further, the GUI 700 can be used to prompt the user for authorization for redirection, to prompt the user as to whether the multimedia content is also to continue to stream to the original receiver device after redirection, and the like. The GUI 700 can be implemented as, for example, part of the software that facilitates provision of multimedia content at the receiver device. Alternately, the GUI 700 can be overlaid on the video content at the content source 108 (or by an intermediary within the provider network 102).

Figure 8:
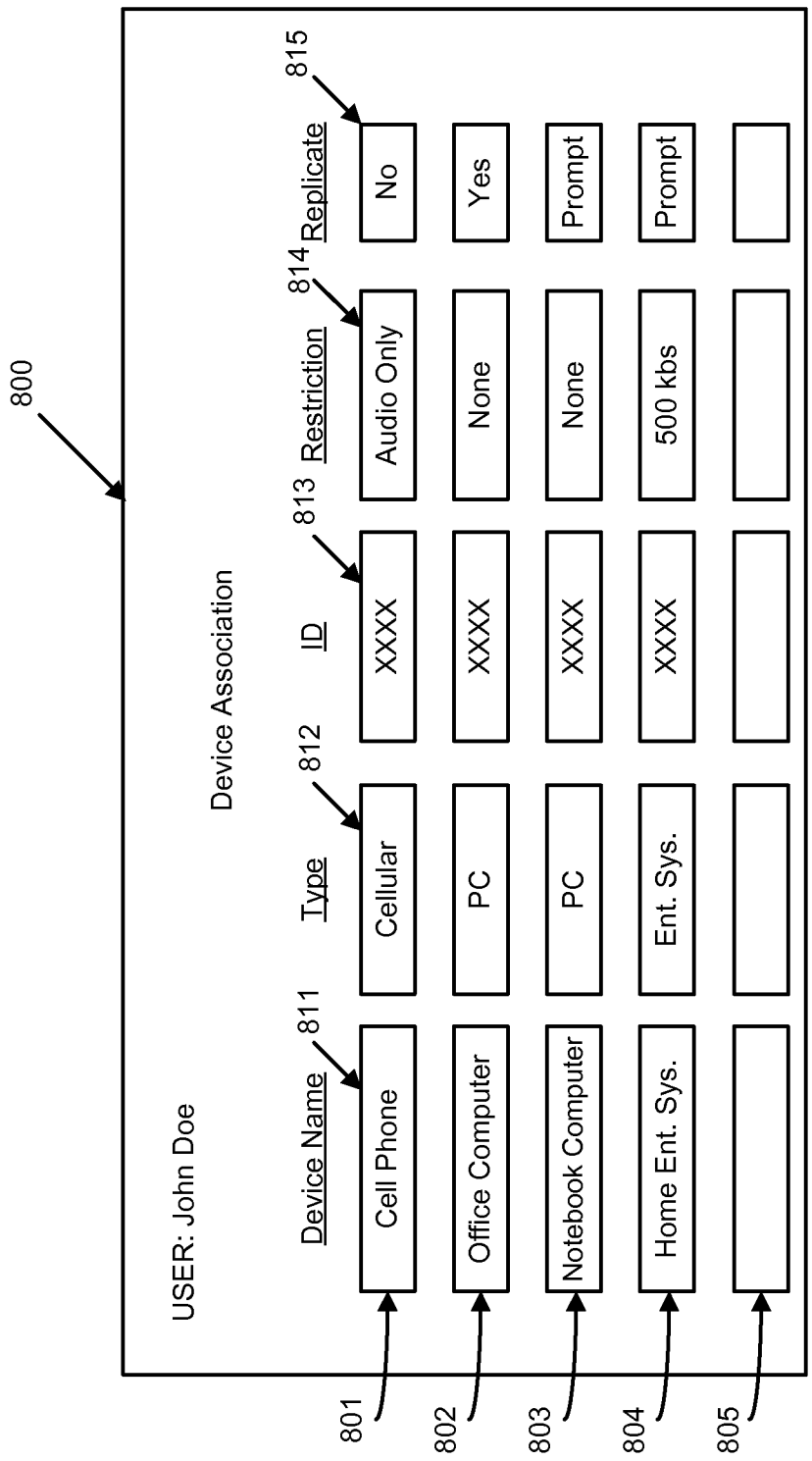
FIG. 8 is a diagram illustrating an example GUI for associating receiver devices with a user in accordance with at least one embodiment of the present disclosure.

FIG. 8 illustrates an example GUI 800 for associating receiver devices with a user in accordance with at least one embodiment. The GUI 800 can be implemented as, for example, a webpage at a website provided by the application server 114 (FIG. 1) to facilitate account management by the user. The GUI 800 includes a plurality of device entries (e.g., device entries 801-805) in which the user can input certain information so as to permit the service provider to identify the corresponding receiver device. For example, each entry can include a name field 811, a type field 812, an identifier (ID) field 813, a restriction field 814, and a replicate field 815.

The name field 811 can include, for example, a text box in which the user can enter a name that the user would like to associate with the corresponding receiver device (e.g., "cell phone", "office computer", "home entertainment system", etc.). The type field 812 can include, for example, a pull-down menu of device types (e.g., cellular, personal computer (PC), entertainment system, video teleconferencing, etc.) that the user can select to identify the particular device type. The device type can be indicative of the capabilities of the corresponding device and therefore allows the service provider to tailor delivery of multimedia content accordingly. The ID field 813 can be used to input a unique identifier associated with the receiver device, such as an IP address, a serial number, a media access control (MAC) address, and the like. The restriction field 814 is used to specify any restrictions or special format parameters on the delivery of multimedia content to the corresponding receiver device. To illustrate, the restriction field 814 can include a pull-down menu that allows the user to specify limitations on any redirected multimedia content transmitted to the corresponding device, such as limiting the redirected multimedia content to only the audio content or only the video content. Likewise, the restriction field 814 can be used to indicate a limit on the multimedia stream (e.g., a maximum bit rate). The restriction field 814 also can be used to pre-authorize redirection to the corresponding receiver device. The replicate field 815 can be used to pre-specify whether a stream redirected from the corresponding device (or alternately redirected to the corresponding receiver device) is to be replicated so that the original receiver device continues to receive the multimedia content while a copy of the multimedia content is redirected to another receiver device of the user.

Figure 9:
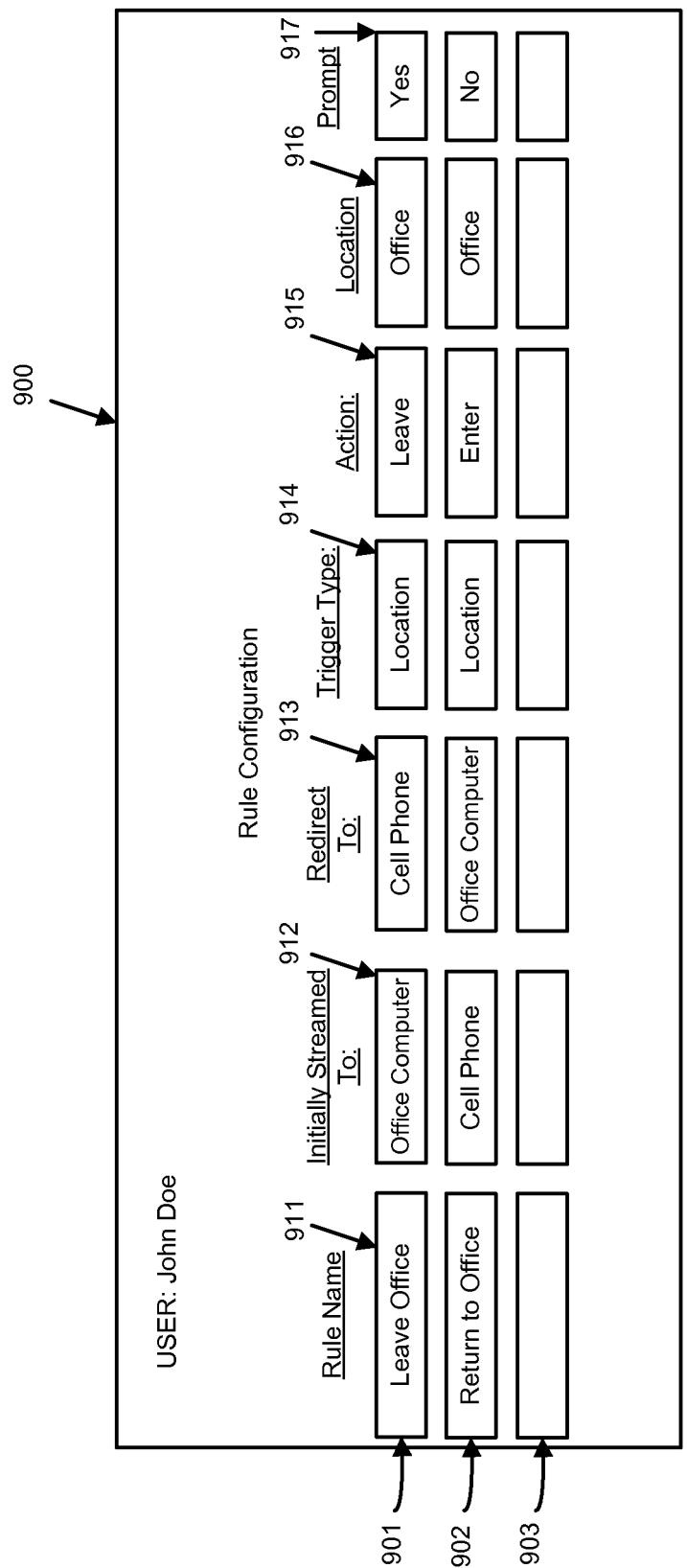
FIG. 9 is a diagram illustrating an example GUI for configuring redirection rules for a user in accordance with at least one embodiment of the present disclosure.

FIG. 9 illustrates a GUI 900 to facilitate specification of redirect rules for a user in accordance with at least one embodiment of the present disclosure. The GUI 900 can be implemented as, for example, a webpage at a website provided by a service provider to facilitate account management by the user. The GUI 900 includes a plurality of rule entries (e.g., rule entries 901-903) in which the user can input certain information so as to institute a redirect rule within the provider network 102 that, when the corresponding parameters are met, triggers the redirect process described above.

In the depicted example, each rule entry includes a name field 911, an initial device field 912, a redirected device field 913, a trigger type field 914, an action field 915, a location field 916, and a prompt field 917. The name field 911 can be used to associate a name with the corresponding redirect rule (e.g., "leave office" or "return to office"). The initial device field 912 and the redirected device field 913 are used to specify which original receiver device-alternate receiver device combination to which the corresponding rule applies. To illustrate the fields 912 and 913 can include pull-down lists populated by the receiver devices entered via GUI 800 of FIG. 8, from which the user can select one or more (or all). The trigger field 914 is used to set the trigger type for the corresponding trigger rule. The trigger type can include, for example, a location change, a time/date change, a power level change, and signal strength change, and the like. The action field 915 is used to set the action type (in relation to the trigger type) that acts as the trigger for the redirect rule. To illustrate, for a "location change" trigger type, the action type can include entering a particular location, leaving a particular location, staying within a particular location for a minimum duration, traveling to/from a particular location at a particular speed (or speed range), and the like. For a "time/date" trigger type, the action type can include a time change to a particular time or a day change to a particular date or day of the week, and the like. The location field 916 is used to specify the particular location associated with corresponding action of action field 915. The location can be specified as a particular geographical area (e.g., a city name, a state name, a country, etc.), as particular location coordinates (e.g., GPS coordinates), as a particular range within a particular geographical area or location coordinates, and the like. In the event of a non-location trigger type, the location field 916 or other field can be used to specify the particular information associated with the trigger type (e.g., the particular time for a "time/date" trigger type, a particular power level for a "power level" trigger type, etc.). The prompt field 917 is used to specify whether the user is to be prompted for authorization to redirect the multimedia content in the event that the corresponding redirect rule triggers the redirection process.

Figure 10:
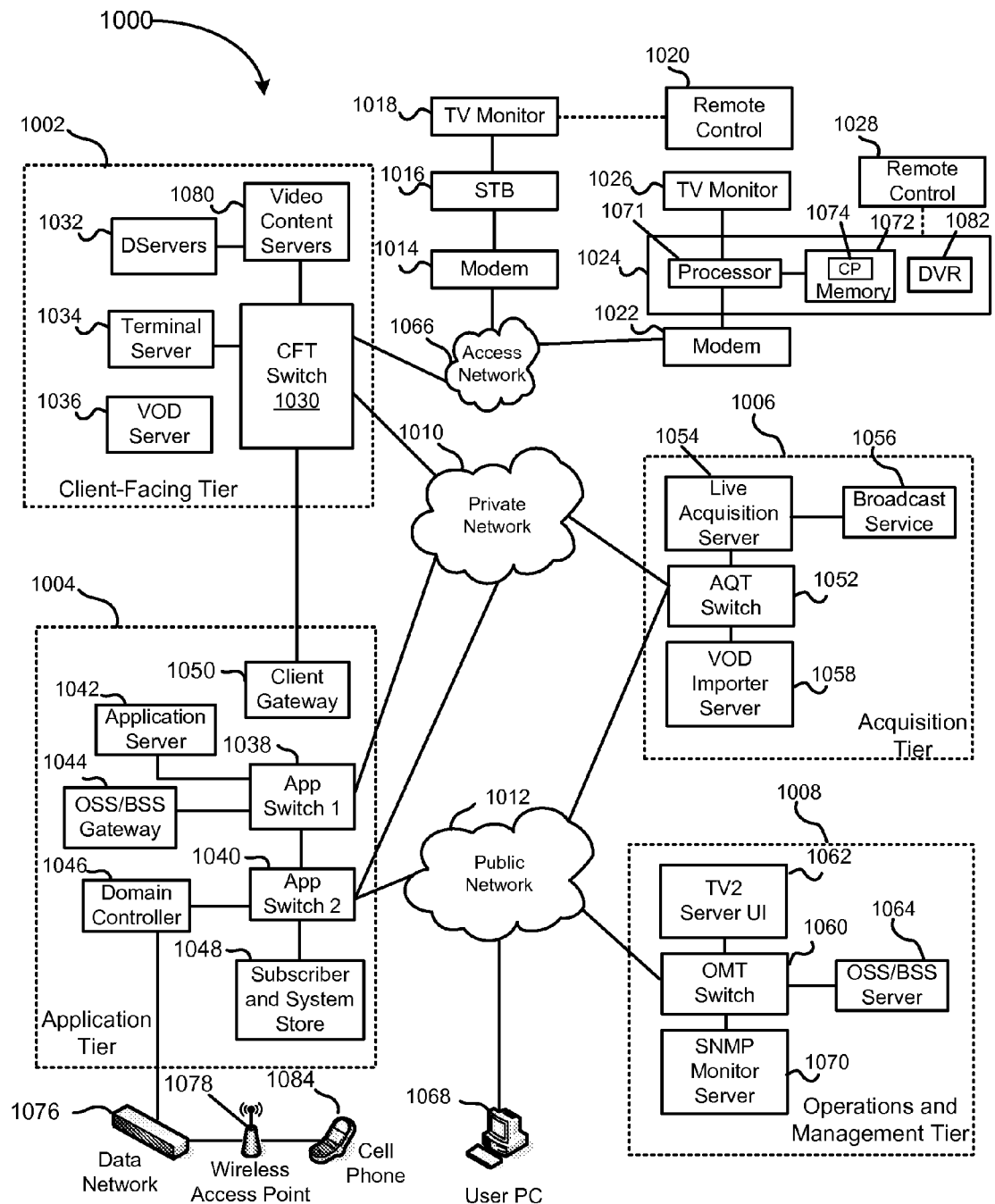
FIG. 10 is a block diagram illustrating an example Internet Protocol Television (IPTV) network in which the multimedia content distribution system of FIG. 1 can be implemented in accordance with at least one embodiment of the present disclosure.

FIG. 10 illustrates an example Internet Protocol Television (IPTV) system 1000 in which the disclosed multimedia content redirection techniques can be implemented in accordance with at least one embodiment of the present disclosure. The IPTV system 1000 can include a client facing tier 1002, an application tier 1004, an acquisition tier 1006, and an operations and management tier 1008. Each tier 1002, 1004, 1006, and 1008 is coupled to a private network 1010, a public network 1012, or both the private network 1010 and the public network 1012. For example, the client-facing tier 1002 can be coupled to the private network 1010. Further, the application tier 1004 can be coupled to the private network 1010 and to the public network 1012, such as the Internet. The acquisition tier 1006 can also be coupled to the private network 1010 and to the public network 1012. Moreover, the operations and management tier 1008 can be coupled to the public network 1012.

The various tiers 1002, 1004, 1006, and 1008 communicate with each other via the private network 1010 and the public network 1012. For instance, the client-facing tier 1002 can communicate with the application tier 1004 and the acquisition tier 1006 via the private network 1010. The application tier 1004 can also communicate with the acquisition tier 1006 via the private network 1010. Further, the application tier 1004 can communicate with the acquisition tier 1006 and the operations and management tier 1008 via the public network 1012. Moreover, the acquisition tier 1006 can communicate with the operations and management tier 1008 via the public network 1012. In a particular embodiment, elements of the application tier 1004 can communicate directly with the client-facing tier 1002.

The client-facing tier 1002 can communicate with user equipment via a private access network 1066, such as an Internet Protocol Television (IPTV) network. In an illustrative embodiment, modems, such as a first modem 1014 and a second modem 1022 can be coupled to the private access network 1066. The client-facing tier 1002 can communicate with a first representative STB device 1016 via the first modem 1014 and with a second representative STB device 1024 via the second modem 1022. The client-facing tier 1002 can communicate with a large number of set-top boxes, such as the representative set-top boxes 1016 and 1024, over a wide geographic area, such as a regional area, a metropolitan area, a viewing area, or any other suitable geographic area that can be supported by networking the client-facing tier 1002 to numerous set-top box devices. In an illustrative embodiment, the client facing tier or any portion thereof can be included at a video head-end office.

In one embodiment, the client-facing tier 1002 can be coupled to the modems 1014 and 1022 via fiber optic cables. Alternatively, the modems 1014 and 1022 can be digital subscriber line (DSL) modems that are coupled to one or more network nodes via twisted pairs, and the client-facing tier 1002 can be coupled to the network nodes via fiber-optic cables. Each set-top box device 1016 and 1024 can process data received through the private access network 1066 via an IPTV software platform such as Microsoft® TV IPTV Edition.

Additionally, the first set-top box device 1016 can be coupled to a first display device 1018, such as a first television monitor, and the second set-top box device 1024 can be coupled to a second display device 1026, such as a second television monitor. Moreover, the first set-top box device 1016 can communicate with a first remote control 1020, and the second set-top box device can communicate with a second remote control 1028. In an exemplary, non-limiting embodiment, each set-top box device 1016 and 1024 can receive data or video from the client-facing tier 1002 via the private access network 1066 and render or display the data or video at the display devices 1018 and 1026 to which it is coupled. In an illustrative embodiment, the set-top box devices 1016 and 1024 can include tuners that receive and decode television programming information for transmission to the display devices 1018 and 1026. The television tuner can be National Television System Committee (NTSC) tuner, an Advanced Television System Committee (ATSC), another suitable analog or digital tuner, or any combination thereof. A signal for a television channel can pass through the tuner before the content is displayed on a monitor.

In an exemplary, non-limiting embodiment, STB devices 1016 and 1024 can receive a multimedia stream including video content data and audio content data from the client-facing tier 1002 via the private access network 1066. The STB device 1016 and 1024 can transmit the video content to an external display device, such as the television monitors 1018 and 1026. The STB devices 1016 and 1024 can also communicate commands received from the remote control devices 1020 and 1028 to the client-facing tier 1002 via the private access network 1066. The STB devices 1016 and 1024, in one embodiment, implement one or more of the display formatting techniques described above with reference to FIGS. 1-4.

In an illustrative embodiment, the client-facing tier 1002 can include a client-facing tier (CFT) switch 1030 that manages communication between the client-facing tier 1002 and the private access network 1066 and between the client-facing tier 1002 and the private network 1010. As shown, the CFT switch 1030 is coupled to one or more data servers 1032 that store data transmitted in response to viewer requests, such as video-on-demand material. The CFT switch 1030 can also be coupled to a terminal server 1034 that provides receiver devices, such as a game application server 1068 and other devices with a common connection point to the private network 1010. In a particular embodiment, the CFT switch 1030 can also be coupled to a video-on-demand (VOD) server 1036 that stores or provides VOD content imported by the IPTV system 1000. The client-facing tier 1002 can also include one or more channel provision servers 1080 that transmit video content requested by viewers via their STB devices 1016 and 1024. In an illustrative, non-limiting embodiment, the channel provision servers 1080 can include one or more multicast servers.

As shown in FIG. 10, the application tier 1004 can communicate with both the private network 1010 and the public network 1012. In this embodiment, the application tier 1004 can include a first application tier (APP) switch 1038 and a second APP switch 1040. In a particular embodiment, the first APP switch 1038 can be coupled to the second APP switch 1040. The first APP switch 1038 can be coupled to an application server 1042 and to an OSS/BSS gateway 1044. The application server 1042 provides applications to the set-top box devices 1016 and 1024 via the private access network

1066, so the set-top box devices 1016 and 1024 can provide functions, such as display, messaging, processing of IPTV data and VOD material, etc. In a particular embodiment, the OSS/BSS gateway 1044 includes operation systems and support (OSS) data, as well as billing systems and support (BSS) data.

Further, the second APP switch 1040 can be coupled to a domain controller 1046 that provides web access, for example, to users via the public network 1012. The second APP switch 1040 can be coupled to a subscriber and system store 1048 that includes account information, such as account information that is associated with users who access the system 1000 via the private network 1010 or the public network 1012. In a particular embodiment, the application tier 1004 can also include a client gateway 1050 that communicates data directly to the client-facing tier 1002. In this embodiment, the client gateway 1050 can be coupled directly to the CFT switch 1030. The client gateway 1050 can provide user access to the private network 1010 and the tiers coupled thereto.

In a particular embodiment, the set-top box devices 1016 and 1024 can access the system via the private access network 1066, using information received from the client gateway 1050. The private access network 1066 provides security for the private network 1010. User devices can access the client gateway 1050 via the private access network 1066, and the client gateway 1050 can allow such devices to access the private network 1010 once the devices are authenticated or verified. Similarly, the client gateway 1050 can prevent unauthorized devices, such as hacker computers or stolen set-top box devices from accessing the private network 1010, by denying access to these devices beyond the private access network 1066.

For example, when a set-top box device 1016 accesses the system 1000 via the private access network 1066, the client gateway 1050 can verify subscriber information by communicating with the subscriber and system store 1048 via the private network 1010, the first APP switch 1038 and the second APP switch 1040. Further, the client gateway 1050 can verify billing information and status by communicating with the OSS/BSS gateway 1044 via the private network 1010 and the first APP switch 1038. The OSS/BSS gateway 1044 can transmit a query across the first APP switch 1038 to the second APP switch 1040, and the second APP switch 1040 can communicate the query across the public network 1012 to an OSS/BSS server 1064. After the client gateway 1050 confirms subscriber and/or billing information, the client gateway 1050 can allow the set-top box device 1016 access to IPTV content and VOD content. If the client gateway 1050 cannot verify subscriber information for the set-top box device 1016, for example because it is connected to a different twisted pair, the client gateway 1050 can deny transmissions to and from the set-top box device 1016 beyond the private access network 1066.

The acquisition tier 1006 includes an acquisition tier (AQT) switch 1052 that communicates with the private network 1010. The AQT switch 1052 can also communicate with the operations and management tier 1008 via the public network 1012. In a particular embodiment during operation of the IPTV system, the live acquisition server 1054 can acquire television or movie content. The live acquisition server 1054 can transmit the television or movie content to the AQT switch 1052, and the AQT switch can transmit the television or movie content to the CFT switch 1030 via the private network 1010.

Further, the television or movie content can be transmitted to the channel provision servers 1080, where it can be encoded, formatted, stored, or otherwise manipulated and prepared for communication to the STB devices 1016 and 1024. The CFT switch 1030 can communicate the television or movie content to the modems 1014 and 1022 via the private access network 1066. The STB devices 1016 and 1024 can receive the television or movie content via the modems 1014 and 1022, and can transmit the television or movie content to the television monitors 1018 and 1026. In an illustrative embodiment, video or audio portions of the television or movie content can be streamed to the STB devices 1016 and 1024.

Further, the AQT switch can be coupled to a VOD importer server 1058 that stores television or movie content received at the acquisition tier 1006 and communicates the stored content to the VOD server 1036 at the client-facing tier 1002 via the private network 1010. Additionally, at the acquisition tier 1006, the VOD importer server 1058 can receive content from one or more VOD sources outside the IPTV system 1000, such as movie studios and programmers of non-live content. The VOD importer server 1058 can transmit the VOD content to the AQT switch 1052, and the AQT switch 1052, in turn, can communicate the material to the CFT switch 1030 via the private network 1010. The VOD content can be stored at one or more servers, such as the VOD server 1036.

When users issue requests for VOD content via the STB devices 1016 and 1024, the requests can be transmitted over the private access network 1066 to the VOD server 1036 via the CFT switch 1030. Upon receiving such requests, the VOD server 1036 can retrieve the requested VOD content and transmit the content to the STB devices 1016 and 1024 across the private access network 1066 via the CFT switch 1030. The STB devices 1016 and 1024 can transmit the VOD content to the television monitors 1018 and 1026. In an illustrative embodiment, video or audio portions of VOD content can be streamed to the STB devices 1016 and 1024.

The operations and management tier 1008 can include an operations and management tier (OMT) switch 1060 that conducts communication between the operations and management tier 1008 and the public network 1012. In the embodiment illustrated by FIG. 10, the OMT switch 1060 is coupled to a TV2 server 1062. Additionally, the OMT switch 1060 can be coupled to the OSS/BSS server 1064 and to a simple network management protocol (SNMP) monitor 1070 that monitors network devices within or coupled to the IPTV system 1000. In a particular embodiment, the OMT switch 1060 can communicate with the AQT switch 1052 via the public network 1012.

In a particular embodiment during operation of the IPTV system, the live acquisition server 1054 can acquire television content from the broadcast service 1056. The live acquisition server 1054 can transmit the television or movie content to the AQT switch 1052, and the AQT switch 1052 in turn can transmit the television content to the CFT switch 1030 via the private network 1010 or to the OMT switch 1060 via the public network 1012. Further, the television content can be encoded at the D-servers 1032, and the CFT switch 1030 can communicate the television content to the modems 1014 and, 1022 via the private access network 1066. The set-top box devices 1016 and 1024 can receive the television content from the modems 1014 and 1022, decode the television content, and transmit the content to the display devices 1018 and 1026 according to commands from the remote control devices 1020 and 1028.

Additionally, at the acquisition tier 1006, the video-on-demand (VOD) importer server 1058 can receive content from one or more VOD sources outside the IPTV system 1000, such as movie studios and programmers of non-live content. The VOD importer server 1058 can transmit the VOD content to the AQT switch 1052, and the AQT switch 1052 in turn can communicate the material to the CFT switch 1030 via the private network 1010. The VOD content can be stored at one or more servers, such as the VOD server 1036.

When a user issues a request for VOD content to set-top box devices 1016 and 1024, the request can be transmitted over the private access network 1066 to the VOD server 1036 via the CFT switch 1030. Upon receiving such a request, the VOD server 1036 can retrieve requested VOD content and transmit the content to the set-top box devices 1016 and 1024 across the private access network 1066 via the CFT switch 1030. In an illustrative embodiment, the live acquisition server 1054 can transmit the television content to the AQT switch 1052, and the AQT switch 1052 in turn can transmit the television content to the OMT switch 1060 via the public network 1012. In this embodiment, the OMT switch 1060 can transmit the television content to the TV2 server 1062 for display to users accessing the user interface at the TV2 server. For example, a user can access the TV2 server 1062 using a personal computer 1068 coupled to the public network 1012.

The domain controller 1046 communicates with the public network 1012 via the second APP switch 1040. Additionally, the domain controller 1046 can communicate via the public network 1012 with the personal computer 1068. For example, the domain controller 1046 can display a web portal via the public network 1012 and allow users to access the web portal using the PC 1068. Further, in an illustrative embodiment, the domain controller 1046 can communicate with at least one wireless network access point 1078 over a data network 1076. In this embodiment, each wireless network access device 1078 can communicate with user wireless devices, such as a cellular telephone 1084.

In a particular embodiment, a set-top box device such as the second set-top box device 1024 can include an STB processor 1071 and an STB memory device 1072 that is accessible to the STB processor 1071. The set-top box device 1024 also includes a STB computer program 1074 that is embedded within the STB memory device 1072. In a particular embodiment, the STB computer program 1074 can contain instructions to receive and execute at least one user television viewing preference that a user has entered by accessing an Internet user account via the domain controller 1046. For example, the user can use the PC 1068 to access a web portal maintained by the domain controller 1046 via the Internet. The domain controller 1046 can query the subscriber and system store 1048 via the private network 1010 for account information associated with the user. In a particular embodiment, the account information can associate the user's Internet account with the second set-top box device 1024. For instance, in an illustrative embodiment, the account information can relate the user's account to the second set-top box device 1024, by associating the user account with an IP address of the second set-top box device with data relating to one or more twisted pairs connected with the second set-top box device 1024, with data related to one or more fiber optic cables connected with the second set-top box device 1024, with an alphanumeric identifier of the second set-top box device 1024, with any other data that is suitable for associating second set-top box device 1024 with a user account, or with any combination of these.

The STB computer program 1074 can contain instructions to receive many types of user preferences from the domain controller 1046 via the access network 1066. For example, the STB computer program 1074 can include instructions to receive a request to record at least one television program at a video content storage module such as a digital video recorder (DVR) 1082 within the second set-top box device 1024. In this example embodiment, the STB computer program 1074 can include instructions to transmit the request to the DVR 1082, where the television program(s) are recorded. In an illustrative embodiment, the STB computer program 1074 can include instructions to receive from the DVR 1082 a recording status with respect to one or more of the television programs and to transmit at least one message regarding the status to a wireless device, such as the cellular telephone 1084. The message can be received at the CFT switch 1030, for instance, and communicated to the domain controller 1046 across the private network 1010 via the second APP switch 1040. Further, the domain controller 1046 can transmit the message to the wireless data network 1076, directly or via the public network 1012, and on to the wireless network access point 1078. The message can then be transmitted to the cellular telephone 1084. In an illustrative embodiment, the status can be sent via a wireless access protocol (WAP). Further details of the IPTV system are taught in U.S. Patent Application Publication No. 2007/0199041, the disclosure of which is hereby incorporated by reference.

Figure 11:
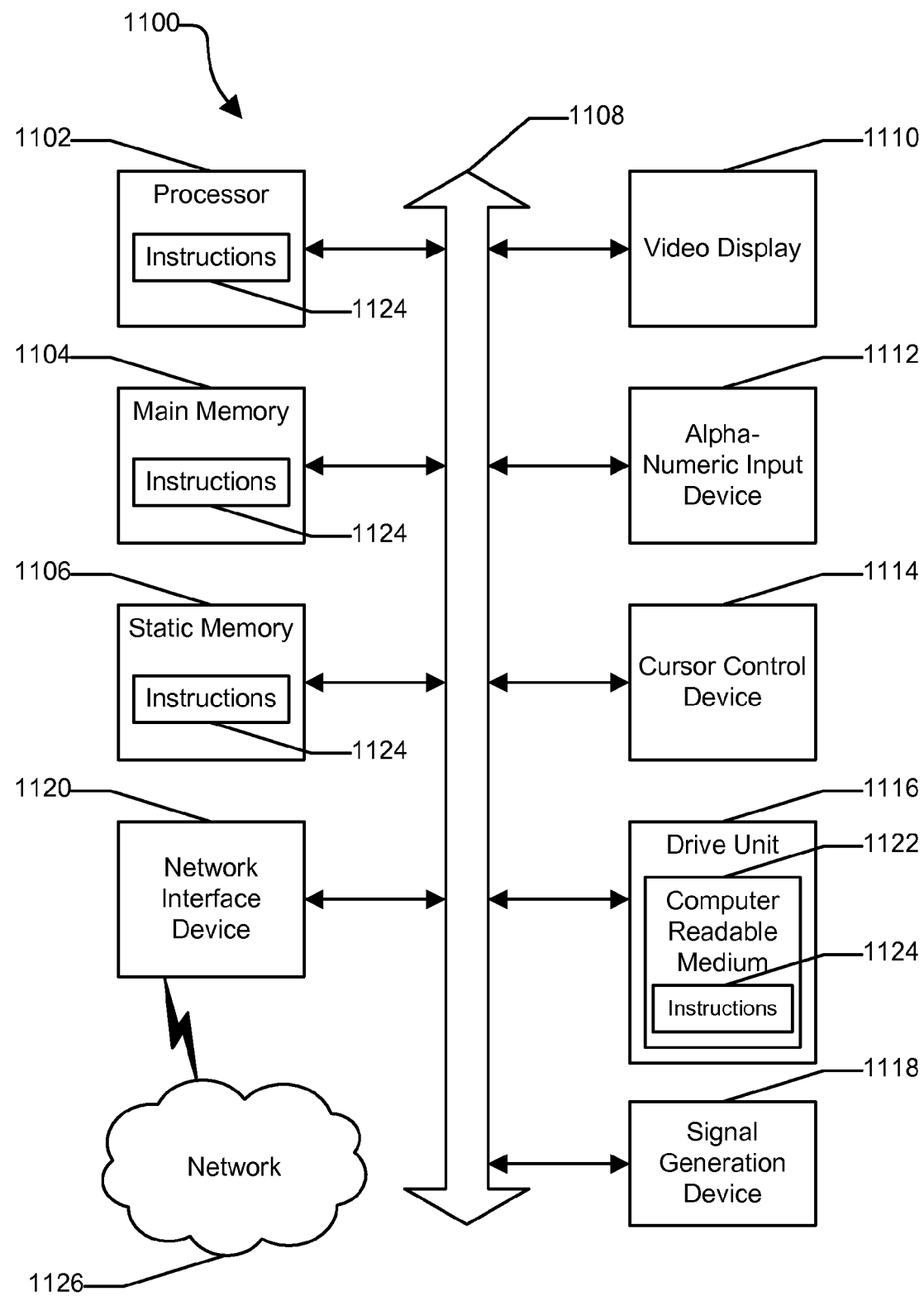
FIG. 11 is a diagram illustrating an example computer system for implementing one or more of the techniques described herein in accordance with at least one embodiment of the present disclosure.

FIG. 11 shows an illustrative embodiment of a general computer system 1100 in accordance with at least one embodiment of the present disclosure. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into, for example, a STB device. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, e.g., a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media. The network interface device 1120 can provide connectivity to a network 1126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

What is claimed is:

1. A method comprising:
   transmitting, by central office equipment of a provider network comprising a processor, a first multimedia stream representative of multimedia content from the provider network to a first receiver device of a plurality of receiver devices associated with a user;
   receiving, by the central office equipment of the provider network, a user-specified redirection rule;
   monitoring, by the central office equipment of the provider network, a plurality of first characteristics of the plurality of receiver devices associated with the user, wherein each first characteristic of the plurality of first characteristics is selected from a group consisting of locations, power levels, and signal levels of the plurality of receiver devices;
   detecting, by the central office equipment of the provider network, a triggering event corresponding to an occurrence of a condition associated with a first characteristic of the plurality of first characteristics of a second receiver device of the plurality of receiver devices, wherein the detecting of the triggering event occurs before the second receiver receives multimedia content;
   responsive to the detected triggering event:
   determining, by the central office equipment of the provider network, a plurality of second characteristics of the second receiver device of the plurality of receiver devices, before the second receiver begins receiving multimedia content;
   transcoding, by the central office equipment of the provider network, a second multimedia stream representative of the multimedia content producing a transcoded second multimedia stream according to a second characteristic of the plurality of second characteristics of the second receiver device;
   prompting equipment of the user for authorization to initiate transmission of the multimedia content to the second receiver device;
   initiating, by the central office equipment of the provider network, a redirection process to redirect transmission of the transcoded second multimedia stream of the multimedia content from the provider network to the second receiver device based on the user-specified redirection rule;
   providing notification to equipment of the user in response to a failed attempt to redirect transmission of the transcoded second multimedia stream of the multimedia content from the provider network to the second receiver device based on the user-specified redirection rule; and
   disabling the user-specified redirection rule in response to instruction received from equipment of the user.

2. The method of claim 1, comprising halting, by the central office equipment of the provider network, the transmitting of the first multimedia stream responsive to initiating transmission of the transcoded second multimedia stream.

3. The method of claim 1, wherein the condition is selected from a group consisting of: a distance between the first receiver device and the second receiver device crossing a threshold; the first receiver device performing entering a first specified location; the first receiver device performing leaving the first specified location; the first receiver device performing coming within a particular distance of the first specified location; the second receiver device performing entering a second specified location; the second receiver device performing leaving the second specified location; the second receiver device performing coming within a particular distance of the second specified location.

4. The method of claim 1, wherein the condition is one of the first receiver device falling below a specified minimum battery power reserve, the first receiver device having a signal strength below a specified minimum, or a combination thereof.

5. The method of claim 1, comprising:
receiving, by the central office equipment of the provider network, a redirect stimulus at the provider network, wherein the redirect stimulus indicates that the multimedia content is to be redirected to a third receiver device of the plurality of receiver devices associated with the user; and
initiating, by the central office equipment of the provider network, transmission of a third multimedia stream of the multimedia content from the central office equipment of the provider network to the third receiver device.

6. The method of claim 1, comprising establishing, by the central office equipment of the provider network, at the central office of the provider network, a listing of receiver devices associated with the user for purposes of redirecting multimedia content, the listing including the first receiver device and the second receiver device.

7. A device, comprising:
a memory that stores executable instructions;
and a provider network stream controller coupled to the memory, wherein the provider network stream controller, when located at a central office of the provider network and responsive to executing the instructions, facilitates performance of operations comprising:
transmitting a first multimedia stream representative of multimedia content to a first receiver device associated with a user via a provider network;
receiving a user-specified redirection rule;
receiving a redirect command in response to an occurrence of a condition related to a second receiver device associated with the user, wherein the receiving of the redirect command occurs before the second receiver device begins receiving multimedia content, and wherein the condition is selected from a group consisting of a location, power level, a signal level associated with the second receiver device, and combinations thereof;
responsive to receiving the redirect command, initiating a redirection process based on the user-specified redirection rule to redirect transmission of a second multimedia stream representative of the multimedia content to the second receiver device and prompting equipment of the user for authorization to initiate transmission of the multimedia content to the second receiver device, wherein the second multimedia stream is transcoded resulting in a transcoded second multimedia stream to correspond to a characteristic of the second receiver device;
providing notification to the equipment of the user in response to a failed attempt to redirect transmission of the transcoded second multimedia stream of the multimedia content from the provider network to the second receiver device based on the user-specified redirection rule; and
disabling the user-specified redirection rule in response to instruction received from the equipment of the user.

8. The device of claim 7, wherein the condition is selected from a group consisting of: a distance between the first receiver device and the second receiver device crossing a threshold; the first receiver device entering a first specified location; the first receiver device leaving the first specified location; the first receiver device coming within a particular distance of the first specified location; the second receiver device entering as second specified location; the second receiver device leaving the second specified location; the second receiver device coming within a particular distance of the second specified location; and combinations thereof.

9. The device of claim 7, wherein the operations further comprise:
detecting a triggering event; and
prompting equipment of the user for authorization to initiate transmission of the multimedia content to the second receiver device responsive to the detecting of the triggering event.

10. The device of claim 7, wherein the operations further comprise halting, by the provider network, the transmitting of the first multimedia stream responsive to initiating transmission of the transcoded second multimedia stream.

11. The device of claim 7, wherein the condition is selected from a group consisting of: a distance between the first receiver device and the second receiver device crossing a threshold; the first receiver device entering a particular first distance of a specified location; the first receiver leaving the particular first distance of the specified location; and the first receiver coming within a particular first distance of the specified location; the second receiver device entering a particular second distance of a specified location; the second receiver device leaving the particular second distance of the specified location; the second receiver device coming within the particular second distance of the specified location; and combinations thereof.

12. The device of claim 7, wherein the condition is selected from a group consisting of: the first receiver device falling below a specified minimum battery power reserve; the first receiver device having a signal strength below a specified minimum; and
combinations thereof.

13. The device of claim 7, wherein the operations further comprise:
receiving, by the provider network, a redirect command at the provider network, wherein the redirect command indicates that the multimedia content is to be redirected to a third receiver device of a plurality of receiver devices associated with the user; and
initiating, by the provider network, transmission of a third multimedia stream of the multimedia content from the provider network to the third receiver device.

14. A non-transitory machine-readable storage medium, comprising instructions that, when executed by a processor of central office equipment of a network provider, cause the processor of the central office equipment of the network provider to facilitate performance of operations comprising:
transmitting a first multimedia stream representative of a multimedia content to a first receiver device of a plurality of receiver devices associated with a user via a provider network;
receiving a user-specified redirection rule;
monitoring a plurality of first characteristics of the plurality of receiver devices associated with the user, wherein the plurality of first characteristics is selected from a group consisting of locations, power level, signal levels of the plurality of receiver devices, and combinations thereof;

detecting a triggering event corresponding to a first characteristic of the plurality of first characteristics of a second receiver device of the plurality of receiver devices meeting a condition, wherein the detecting of the triggering event occurs before the second receiver receives multimedia content;

responsive to the detected triggering event, initiating a redirection process based on the user-specified redirection rule to redirect transmission of a second multimedia stream representative of the multimedia content from the provider network to the second receiver device and prompting equipment of the user for authorization to initiate transmission of the multimedia content to the second receiver device;

providing notification to equipment of the user in response to a failed attempt to redirect transmission of the second multimedia stream from the provider network to the second receiver device based on the user-specified redirection rule; and disabling the user-specified redirection rule in response to instruction received from equipment of the user.

15. The non-transitory machine-readable storage medium of claim 14, wherein the operations further comprise prompting equipment of the user for authorization to initiate transmission of the multimedia content to the second receiver device responsive to the detected triggering event.

16. The non-transitory machine-readable storage medium of claim 14, wherein the operations further comprise halting, by the provider network, the transmitting of the first multimedia stream responsive to initiating transmission of the second multimedia stream.

17. The non-transitory machine-readable storage medium of claim 14, wherein the condition is selected from a group consisting of: a distance between the first receiver device and the second receiver device crossing a threshold; the first receiver device performing entering a first specified location; the first receiver device performing leaving the first specified location; the first receiver device performing coming within a particular distance of the first specified location; the second receiver device performing entering a second specified location; the second receiver device performing leaving the second specified location; the second receiver device performing coming within a particular distance of the second specified location; and combinations thereof.

18. The non-transitory machine-readable storage medium of claim 14, wherein the condition is selected from a group consisting of: the first receiver device falling below a specified minimum battery power reserve; the first receiver device having a signal strength below a specified minimum; and combinations thereof.

19. The non-transitory machine-readable storage medium of claim 14, wherein the operations further comprise:

receiving, by the provider network, a redirect command at the provider network, wherein the redirect command indicates that the multimedia content is to be redirected to a third receiver device of the plurality of receiver devices associated with the user; and initiating, by the provider network, transmission of a third multimedia stream of the multimedia content from the provider network to the third receiver device.

* * * * *